(12) United States Patent
Kubota

(10) Patent No.: US 7,363,465 B2
(45) Date of Patent: Apr. 22, 2008

(54) SEMICONDUCTOR DEVICE, MICROCOMPUTER, AND ELECTRONIC EQUIPMENT

(75) Inventor: Satoshi Kubota, Nagano (JP)

(73) Assignee: Seiko Epson Corporation (JP)

( * ) Notice: Subject to any disclaimer, the term of this patent is extended or adjusted under 35 U.S.C. 154(b) by 329 days.

(21) Appl. No.: 11/157,520

(22) Filed: Jun. 21, 2005

(65) Prior Publication Data
US 2005/0289320 A1    Dec. 29, 2005

(30) Foreign Application Priority Data
Jun. 25, 2004    (JP)    ............... 2004-188492

(51) Int. Cl.
G06F 12/08    (2006.01)
(52) U.S. Cl. .................. 711/220; 711/105; 711/154; 711/202; 365/230.01
(58) Field of Classification Search ............... 711/202, 711/220, 154, 105; 365/230.01
See application file for complete search history.

(56) References Cited

U.S. PATENT DOCUMENTS

| | | | | |
|---|---|---|---|---|
| 4,954,944 A | * | 9/1990 | Ikeda ..................... | 713/600 |
| 5,278,961 A | * | 1/1994 | Mueller ................... | 711/206 |
| 5,301,287 A | * | 4/1994 | Herrell et al. ............ | 711/202 |
| 5,428,758 A | * | 6/1995 | Salsburg .................. | 711/165 |
| 6,000,006 A | * | 12/1999 | Bruce et al. ............. | 711/103 |
| 6,366,995 B1 | * | 4/2002 | Vilkov et al. ............ | 711/206 |
| 6,697,076 B1 | * | 2/2004 | Trivedi et al. ........... | 345/568 |

FOREIGN PATENT DOCUMENTS

| | | |
|---|---|---|
| DE | 19935092 | 7/1989 |
| GB | 2385688 | 8/2003 |
| JP | 01-237862 | 9/1989 |
| JP | 02-115957 | 4/1990 |
| JP | 2000-101622 | 4/2000 |
| JP | 2004-021750 | 1/2004 |

OTHER PUBLICATIONS

Communication from Japanese Patent Office regarding counterpart application.

* cited by examiner

*Primary Examiner*—Stephen C. Elmore
(74) *Attorney, Agent, or Firm*—Harness, Dickey & Pierce, P.L.C.

(57) ABSTRACT

A semiconductor device comprising a bus master and a bus slave connected by a second bus is provided. A bus control unit (BCU) comprises a first relative address control circuit that performs a process for requesting the access using a relative address to a semiconductor storage medium through the second bus, the process including generation of a relative address corresponding to an absolute address based on the received absolute address and generation of an identification signal indicating the relative address. The memory controller comprises a second relative address control circuit that decides whether the received access address is a relative address or not and, if the received access address is a relative address, calculates an absolute address corresponding to the relative address.

7 Claims, 8 Drawing Sheets

SEMICONDUCTOR DEVICE, MICROCOMPUTER, AND ELECTRONIC EQUIPMENT

RELATED APPLICATIONS

This application claims priority to Japanese Patent Application No. 2004-188492 filed Jun. 25, 2004 which is hereby expressly incorporated by reference herein in its entirety.

BACKGROUND

1. Technical Field

The present invention relates to a semiconductor device, a microcomputer, and electronic equipment.

2. Related Art

Formerly, in the bus interface for accessing data associated with an address, as used in a memory, a bus master outputs the value of an absolute address into an address bus to perform the interface function. Either a parallel bus or a serial bus performs the same operation for the output of an absolute address.

The parallel bus has a problem that the number of address signal lines increases as the memory space accessed expands, resulting in increases of cost and electric power consumption.

The former techniques read consecutive memory data by a burst access to memory, and use this burst access together with a command queue and a cache, thereby improving the efficiency of the memory access.

These methods, however, involve high cost hardware. In addition, there is a problem that fetched data may be wasted when the program branches.

The techniques such as time-division output of addresses and data, and interfacing by the use of a serial bus are used. The serial bus, however, requires a clock cycle corresponding to the number of bits in the address for the output of the address, and therefore there is a problem that the time needed for the bus access increases.

In order to improve the transfer efficiency of the bus in the former serial bus, such a burst access as to transfer the data in an arbitrary address range from the base address is used. However, there is a problem of decreasing of data transfer efficiency when the address of instruction executed by a central processing unit (a CPU) is branched and in the data access to a random address.

The present invention addresses the above described problems and is intended to provide a semiconductor device, a microcomputer, and electronic equipment that enable the access time to be shorten at low cost with low electric power consumption.

SUMMARY

The present invention is a semiconductor device, comprises: a bus master comprising a bus control circuit that receives an access address from a given module through a first bus and requests access based on the received access address to a semiconductor storage medium through a second bus; and a bus slave comprising a memory controller that controls access to the semiconductor storage medium based on an access request received through the second bus; wherein: the bus control circuit of the bus master comprises a first relative address control circuit that performs a process for requesting the access using a relative address to the semiconductor storage medium through the second bus, the process including generation of the relative address corresponding to an absolute address received through the first bus and generation of an identification signal indicating the relative address; and the memory controller of the bus slave comprises a second relative address control circuit that decides whether the received access address is a relative address or not and, if the received access address is a relative address, calculates an absolute address corresponding to the relative address.

The given module that requests access may be, for example, a CPU (a processing circuit in the general meaning), a memory management unit (MMU), a cache, or a direct memory access controller (DMAC).

The semiconductor storage medium is a memory such as a static random access memory (SRAM), a synchronous dynamic random access memory (SDRAM), or a read only memory (ROM).

The first bus and a third bus are interfaces using absolute addresses in the same way as in the former techniques, and the second bus performs the bus interface operations using a relative address.

The second bus may comprise, for example, signal lines of serial data address (SDA) signal and relative address identification (AREL) signal, the AREL signal being set at the primary level (for example, level H) while the relative address is output to the SDA signal line.

A predetermined rule may be established in a series of access requests such that the absolute address is sent just on the first access request and the address is generated as the data of difference from the previous address on the subsequent access requests. Thus the access with the small amount of data compared to the access using the absolute address becomes possible, and as a result, the time required for the address output can be shortened.

The identification signal may be set such that whether the access address is a relative address or an absolute address can be identified based on whether the identification signal is at the primary level or at the secondary level.

According to the invention, in the bus interface, the access by using the address information that shows a relative address enables the access speed to be improved and the electric power consumption as well as the implementation cost to be reduced.

The signal changes required for the address output are reduced and therefore the electric power consumption decreases.

In such access as to increment the program counter, for example, when the bus master fetches a command of a CPU, the usage of a relative address is largely effective. Even when the program counter is not incremented and does not have the address next to the previous address because of a branch of the program, the address output by using a relative address can be performed with fewer signal changes compared to the address output using an absolute address.

The invention transfers data by using a relative value in the second bus. The relative value is calculated based on a predetermined rule. For example, the value of the data used in the previous access, a fixed value, the value of the data set for a predetermined register, etc., are used as the data value that functions as the base. Arbitrary calculation methods such as the logic operation EXCLUSIVE OR (XOR) and Huffman coding other than signed addition and subtraction can be used for calculating the relative value.

According to the invention, in the bus interface, the access by using the transfer data information that shows a relative value enables the access speed to be improved and the electric power consumption as well as the implementation cost to be reduced.

In the semiconductor device of the invention, the address bus of the above described second bus is a serial bus.

According to the invention, the bus interface speed of the second bus is improved. The replacement with the serial bus further decreases interface signals, thereby reducing the implementation cost. The use of a serial bus can avoid the noise problem that counts in the parallel bus because of simultaneous switching of the signals.

The system configuration becomes easy by using the configuration of signals of a scalable serial bus. For example, if the number of bits of the address that is output as the first data field of the SDA signal shall be transmitted as a predetermined rule, a serial bus can consist of only the SDA signal line without the AREL signal line. The data transfer efficiency of the bus interface can be improved by separating the SDA signal line into two lines of a data signal line and an address signal line, increasing the number of the SDA signal lines to two or more, or combining these ways.

The invention is transferring data read or written through a data bus of the above described second bus based on the previous access data or a relative value from specified value data.

The invention is a semiconductor device comprising a bus master comprising a bus control circuit that receives an access address from a given module through a first bus and requests access based on the received access address to a semiconductor storage medium through a second bus; wherein: the bus control circuit comprises a first relative address control circuit that performs a process for requesting the access using a relative address to the semiconductor storage medium through the second bus, the process including generation of the relative address corresponding to an absolute address received through the first bus and generation of an identification signal indicating the relative address.

The invention is a semiconductor device comprising a bus slave comprising a memory controller that controls access to the semiconductor storage medium based on an access request received through the second bus; wherein: the memory controller comprises a second relative address control circuit that decides whether the received access address is a relative address or not and, if the received access address is a relative address, calculates an absolute address corresponding to the relative address.

The invention is a microcomputer comprising the semiconductor device according to any one of the above.

The invention is electronic equipment comprising: the microcomputer described above; receiving input information; and outputting a result processed by the microcomputer based on the input information.

DETAILED DESCRIPTION

Semiconductor Device

A preferred embodiment of the present invention will now be described in detail with reference to the drawings.

Figure 1:
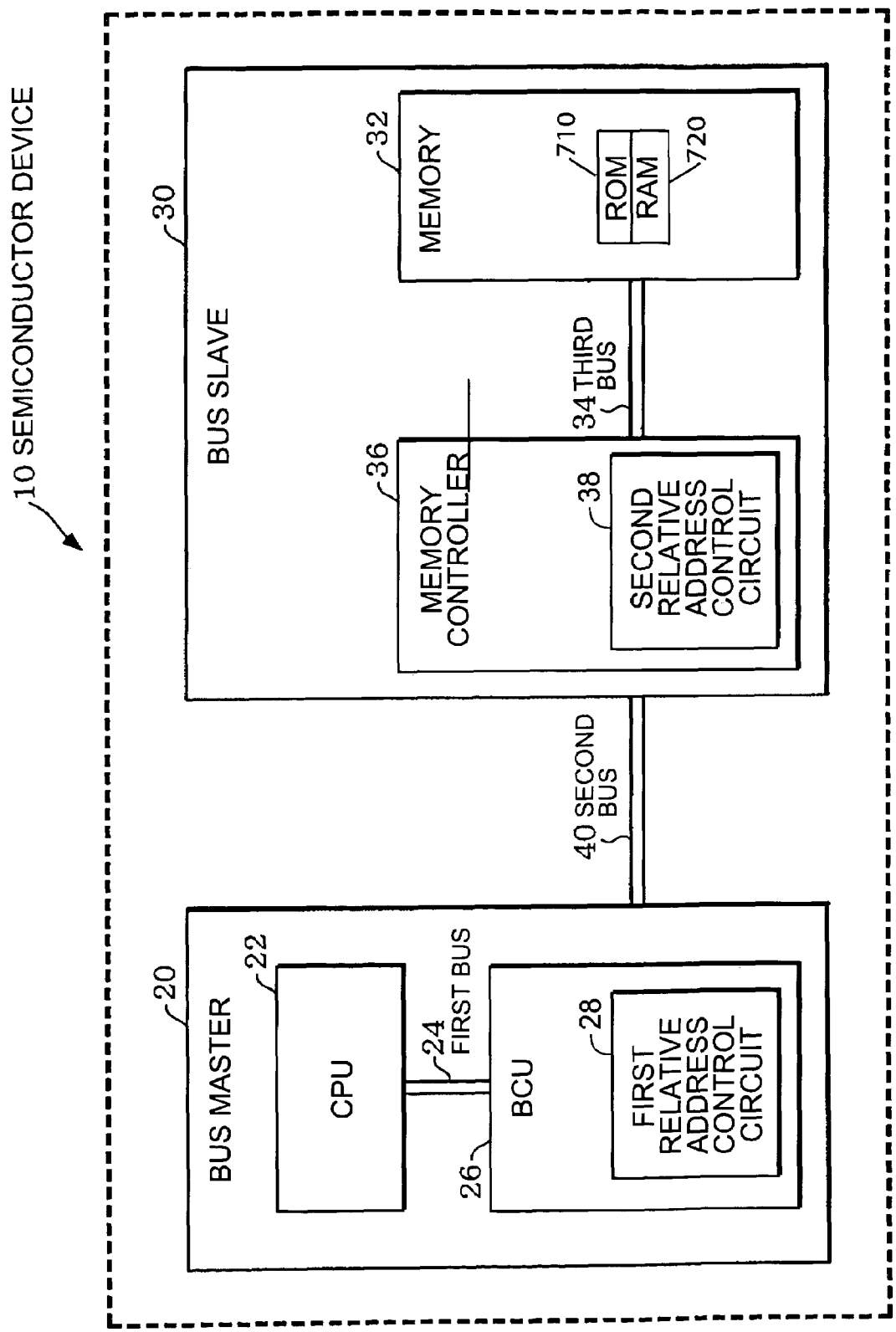
FIG. 1 is a view for illustrating an example of a semiconductor device of the present embodiment.

FIG. 1 is a view for illustrating an example of a semiconductor device of the present embodiment.

The semiconductor device of FIG. 1 is structured to include both a bus master 20 and a bus slave 30, but the structure of including only either of them is embraced in the scope of the present invention.

A semiconductor device 10 of the present embodiment includes the bus master 20 and the bus slave 30 connected by a second bus (including an address bus) 40.

A first bus 24 and a third bus 34 are interfaces using absolute addresses in the same way as in the former techniques, and the second bus 40 performs the bus interface operations using a relative address.

The bus master 20 includes a host 22 (which may be a direct memory access: DMA, etc.,) such as a CPU that requests access and a bus control unit (BCU) 26 connected with the host 22 through the first bus 24.

The unit that requests access may be, for example, a CPU (a processing circuit in the general meaning), a MMU, a cache, and a DMAC.

The bus control circuit (BCU) 26 receives an access address (an absolute address) from the host 22 (which may be a DMA) such as a CPU, which is a predetermined module, through the first bus 24 and requests access to a semiconductor storage medium 32 through the second bus 40 based on the received access address.

The bus control circuit 26 includes a first relative address control circuit 28 that generates a relative address based on the absolute address received through the first bus 24 in accordance with a predetermined rule and performs the process necessary for requesting access together with an identification signal indicating that the address is a relative address to the semiconductor storage medium 32 through the second bus 40.

The second bus may comprise, for example, signal lines of serial data address (SDA) signal and relative address identification (AREL) signal, and sets the AREL signal at the primary level (for example, level H) while the relative address is output to the SDA signal line, thereby enabling the bus slave to decide whether the received signal is an absolute address or a relative address.

The bus slave 30 includes a memory controller 36 that controls access to the semiconductor storage medium 32 based on the access request received through the second bus 40.

The semiconductor storage medium 32 is a memory such as a SRAM, a SDRAM, or a ROM.

The memory controller 36 includes a second relative address control circuit 38 that decides based on the received identification signal whether the received access address is a relative address or not and, if the address is a relative address, calculates the absolute address corresponding to the relative address based on the rule corresponding to the predetermined rule for the relative address.

According to the present embodiment, in the bus interface, the access by using the address information that shows a relative address enables the access speed to be improved and the electric power consumption as well as the implementation cost to be reduced.

The relative address is generated as the data of a difference from the absolute address accessed on the previous occasion. In this way, the access can be performed with the small amount of data compared to the access using the absolute address, resulting in the reduction of the time required for the address output.

The signal changes required for the address output are reduced and therefore the electric power consumption decreases.

The address bus of the second bus may comprise a serial bus.

When a parallel bus is replaced with a serial bus, fewer interface signals are required, thereby reducing the implementation cost. The use of the serial bus can avoid the noise problem that counts in the parallel bus. Although the address output on the serial bus takes more time than that on the parallel bus at the same clock rate, the usage of the relative address for the address output can reduce the bus cycle time.

The system configuration becomes easy by the use of the configuration of a scalable serial bus. Specifically, the increase and decrease of the number of signal lines for address signals or data signals of the serial bus allow the most suitable configuration from the viewpoints of cost and performance to be designed.

In such access as to increment the program counter, for example, when the bus master fetches a command of a CPU, the usage of a relative address is largely effective.

Figure 8A:
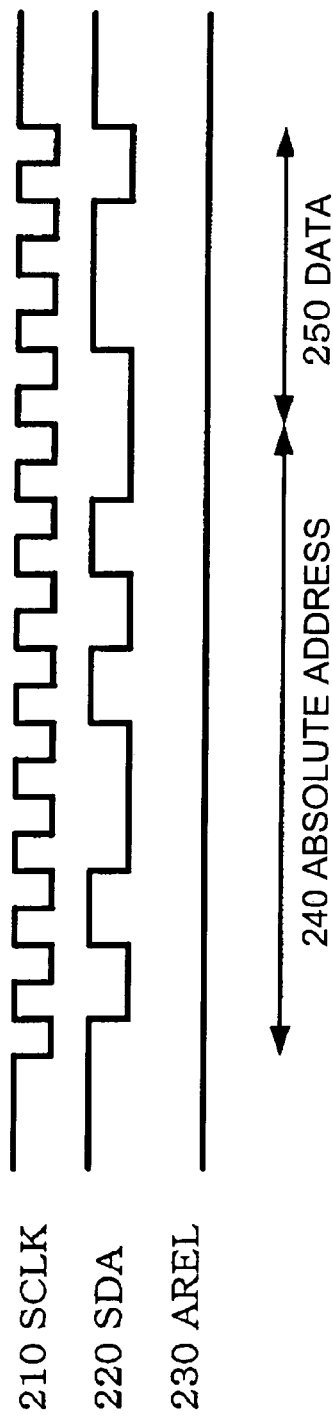
FIGS. 8A and 8B are timing charts in an absolute address access and a relative address access, respectively.
Figure 8B:
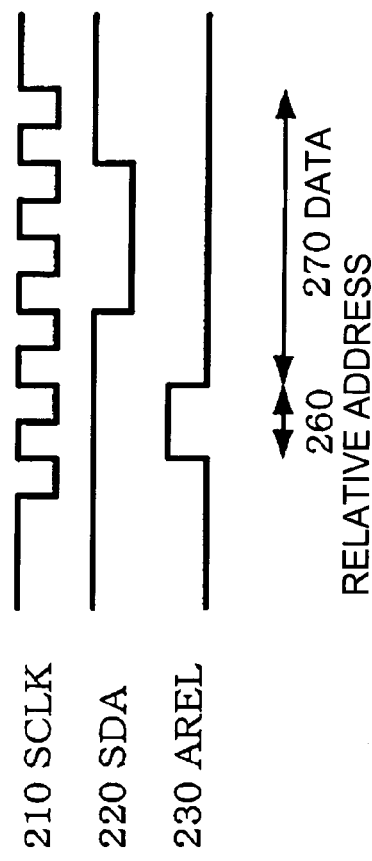

FIGS. 8A and 8B are timing charts in an absolute address access and a relative address access, respectively.

An SCLK 210 is a system clock.

An SDA 220 is a serial data address signal line and constitutes a bus for transferring data and address with the serial interface.

An AREL 230 is an identification signal that indicates whether the address is a relative address or an absolute address and is set to the primary level (or example, level H) while the relative address is transferred on the SDA 220.

FIG. 8A is a timing chart when data is transferred using the absolute address to the SDA 220. While the absolute address and the data flow on the SDA 220, the AREL 230 is set to the secondary level (for example, level L).

FIG. 8B is a timing chart when data is transferred using the relative address to the SDA 220. While the relative address flows on the SDA 220, the AREL 230 is set to the primary level (for example, level H), and while the data flows on the SDA 220, the AREL 230 is set to the secondary level (for example, level L).

As shown in FIGS. 8A and 8B, the access with the use of the relative address takes shorter address transmission time than the access with the use of the absolute address.

Figure 2:
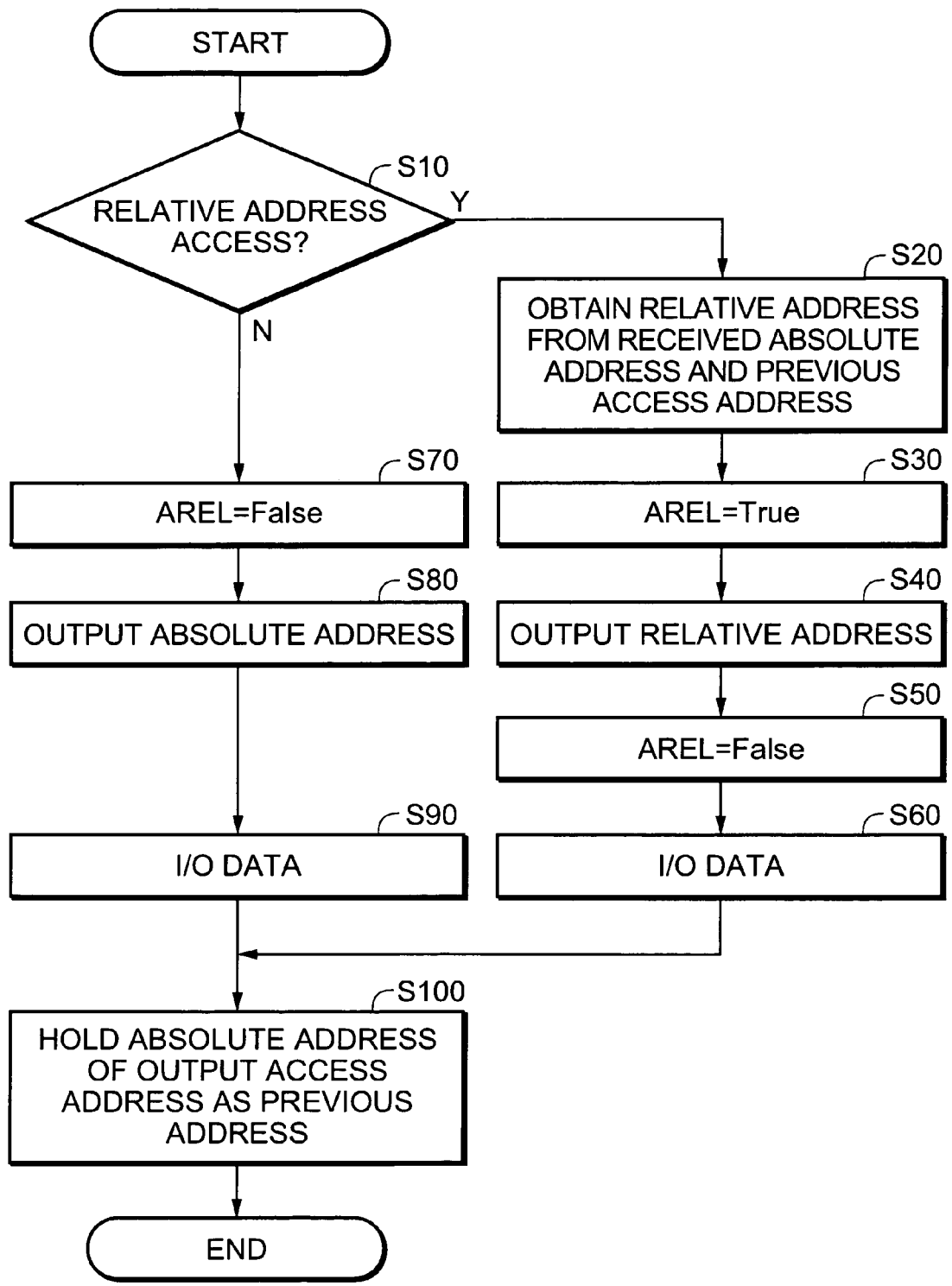
FIG. 2 is a flow chart showing an operation example of a bus master of the present embodiment.

FIG. 2 is a flow chart showing an operation example of a bus master of the present embodiment.

The bus master performs the following processes when receiving the access request based on the absolute address through the first bus from the CPU or the like.

When the access request is performed based on a relative address to the second bus, the relative address is obtained from the received absolute address and the previous access address (steps S10 and S20).

Then the identification signal (AREL signal) is set to being 'TRUE' (for example, at the level H) and is output (step S30), and the obtained relative address is output to the second bus (step S40).

When the output of the relative address to the second bus is completed, the identification signal (AREL signal) is changed to being 'False' for example, at the level L) (step S50).

The data is input and output on the second bus (step S60).

When the access request is performed based on the absolute address to the second bass, the identification signal (AREL signal) is set to being 'False' (for example, at the level L) and is output (steps S10 and S70), and the absolute address is also output to the second bus (step S80).

The data is input to and output from the second bus (step S90).

Then the absolute address of the output access address is held as the address for use in the next bus access based on the relative address (step S100).

Figure 3:
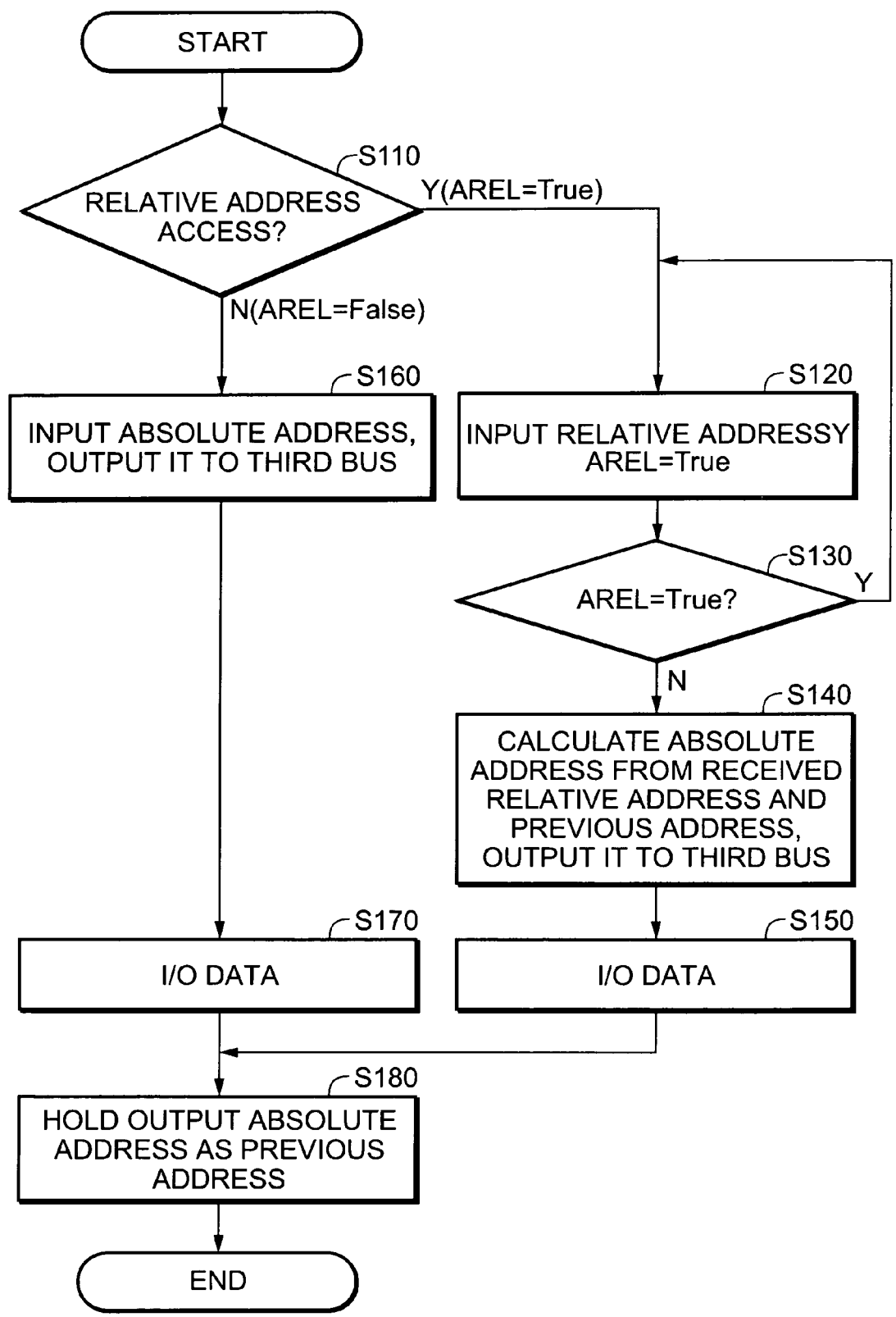
FIG. 3 is a flow chart showing an operation example of a bus slave of the present embodiment.

FIG. 3 is a flow chart showing an operation example of a bus slave of the present embodiment.

The bus slave performs the following processes when receiving the access request through the second bus.

It is decided based on the identification signal (AREL signal) associated with the access request whether the access request is an absolute address access request (step S110).

If the access request is a relative address access request, the relative address is input while the identification signal (AREL signal) is "TRUE" (for example, at the level H) (steps S120 and S130).

The absolute address is calculated based on the received relative address and the previous address, and then is output to a third bus (step S140).

The data is input and output on the third bus (step S150).

If the access request is an absolute address access request, the absolute address is input and output to the third bus (step S160).

The data is input and output on the third bus (step S170).

Then the absolute address of the access address output to the third bus is held as the address for use in the next bus access based on the relative address (step S180).

Figure 4:
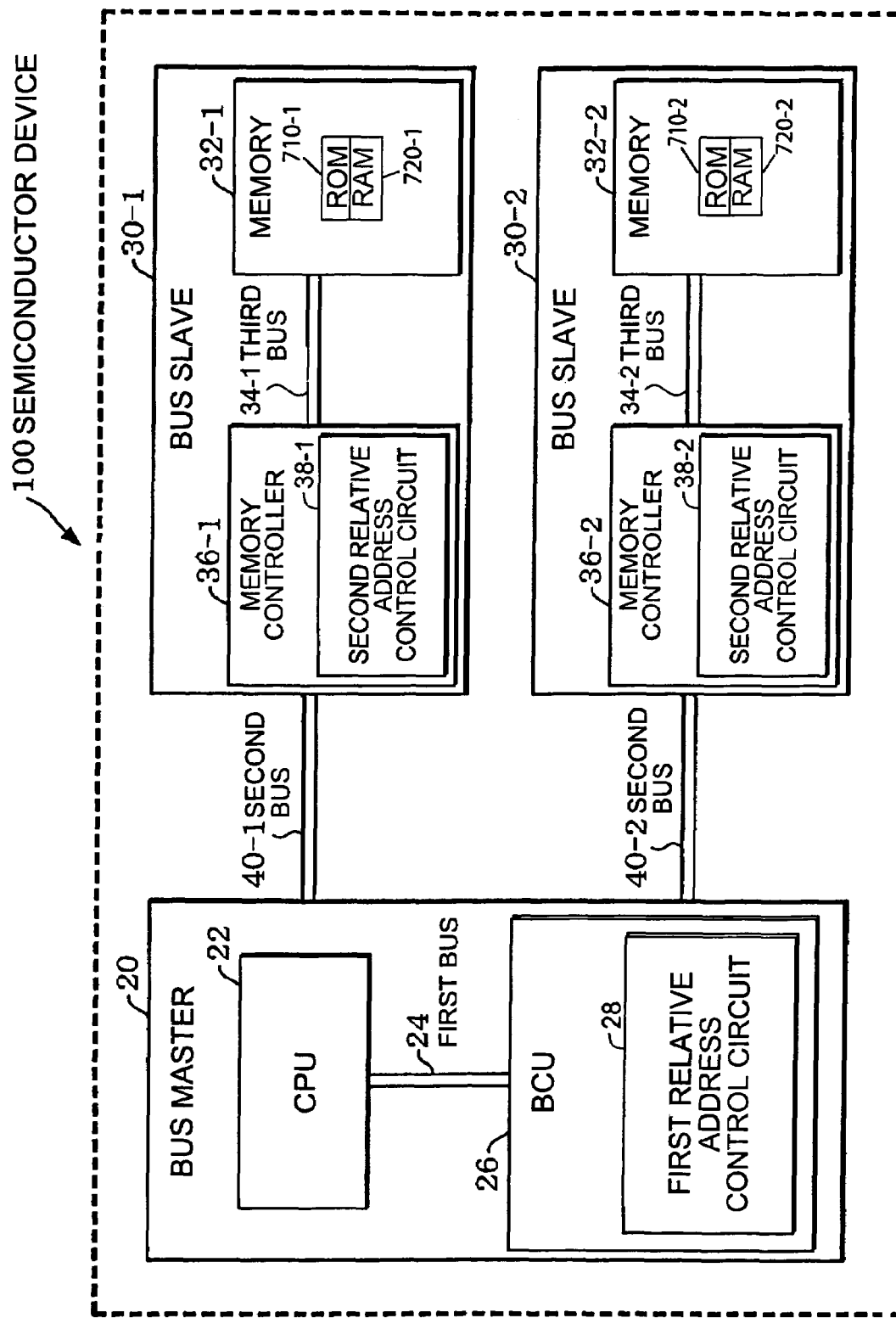
FIG. 4 is a structure example using a plurality of relative address buses.

FIG. 4 is a structure example using a plurality of relative address buses.

The first bus and the third bus are interfaces using the absolute addresses in the same way as in the former techniques, and the second buses 40-1 and 40-2 perform the bus interface operations using the relative addresses.

The bus master 20 includes the host 22 (which may be a DMA, etc.,) such as a CPU that requests access and the BCU 26 connected with the host 22 through the first bus 24.

The bus control circuit (BCU) 26 receives an access address (an absolute address) from the host 22 (which may be a DMA) such as a CPU, which is a given module, through the first bus 24, and requests access to a semiconductor storage medium 32-1 or 32-2 through a second bus 40-1 or 40-2 based on the received access address.

The bus control circuit 26 includes a first relative address control circuit 28 that generates a relative address based on the absolute address received through the first bus 24 in accordance with a predetermined rule and performs the process necessary for requesting the access together with an identification signal indicating that the address is a relative address to the semiconductor storage medium 32-1 or 32-2 through the second bus 40-1 or 40-2.

A bus slave 30-1 or 30-2 includes a memory controller 36-1 or 36-2 that controls access to the semiconductor storage medium 32-1 or 32-2 based on the access request received through the second bus 40-1 or 40-2.

The semiconductor storage medium 32-1 or 32-2 is a memory such as a SRAM, a SDRAM, or a ROM.

The memory controller 36-1 or 36-2 includes a second relative address control circuit 38-1 or 38-2 that decides based on the received identification information whether the received access address is a relative address or not and, if the address is a relative address, calculates the absolute address corresponding to the relative address based on the rule corresponding to the predetermined rule for the relative address.

In the serial bus that is a relative address bus, since there is a small number of interface signals compared to the parallel bus, the performance of the bus interface can be improved by simultaneously operating the individual second buses (relative address buses) 40-1 and 40-2 for the bus slaves as shown in FIG. 4. Increasing the number of serial data address signal lines from one to two or more enables scalable improvement of the efficiency of the bus interface.

Microcomputer

Figure 5:
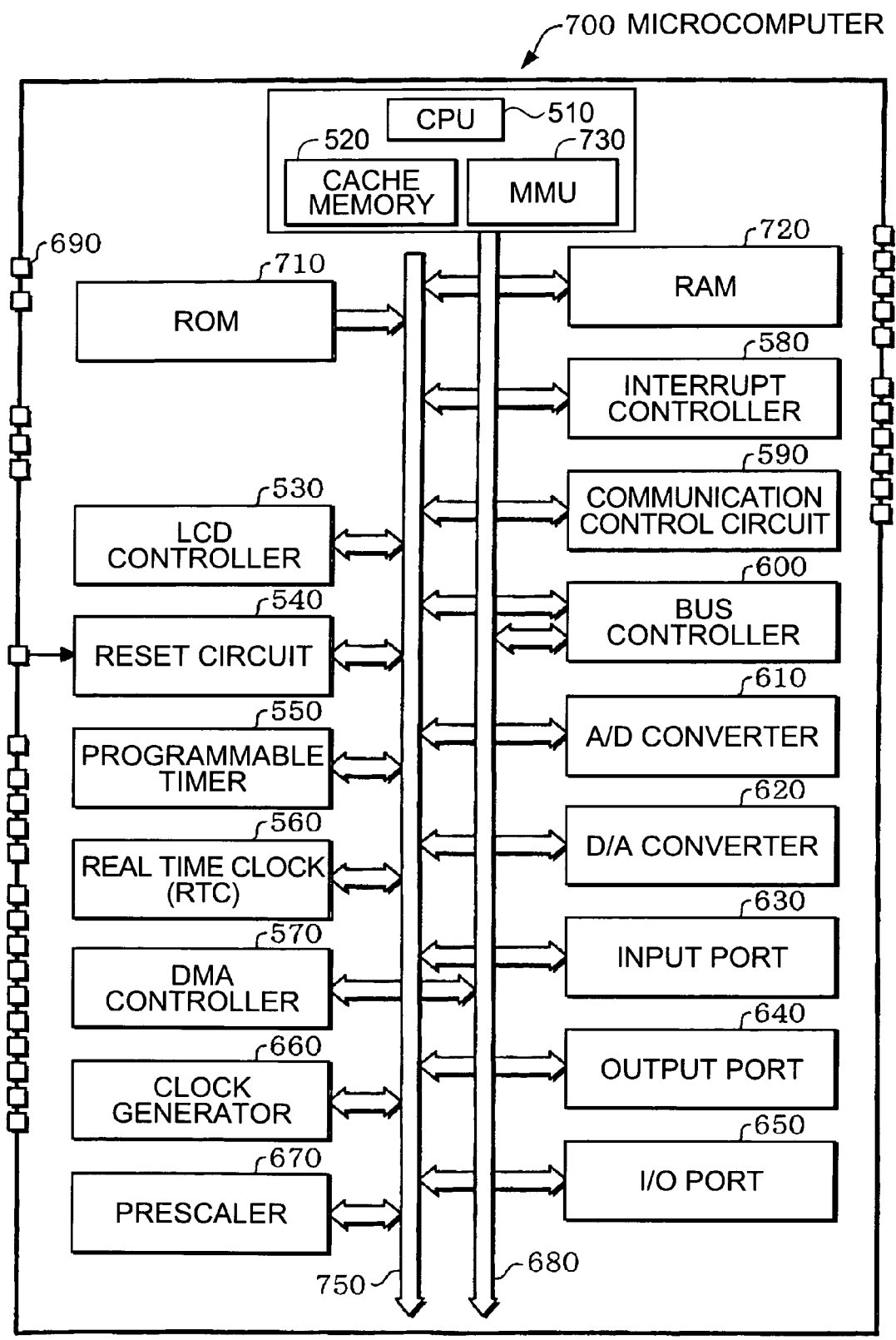
FIG. 5 is an example of the hardware block diagram of a microcomputer of the present embodiment.

FIG. 5 is an example of the hardware block diagram of a microcomputer of the present embodiment.

A microcomputer 700 includes a CPU 510, a cache memory 520, a liquid crystal display (LCD) controller 530, a reset circuit 540, a programmable timer 550, a real time clock (RTC) 560, a DRAM controller-cum-bus interface (I/F) 570, an interrupt controller 580, a serial interface 590, a bus controller 600, an analog to digital (A/D) converter 610, a digital to analog (D/A) converter 620, an input port 630, an output port 640, an input and output (I/O) port 650, a clock generator 660, and a prescaler 670; and an absolute address bus 680, a relative address bus 750, and various types of pins 690 that connect these units.

The bus controller 600 has, for example, the structure described in FIG. 1.

Electronic Equipment

Figure 6:
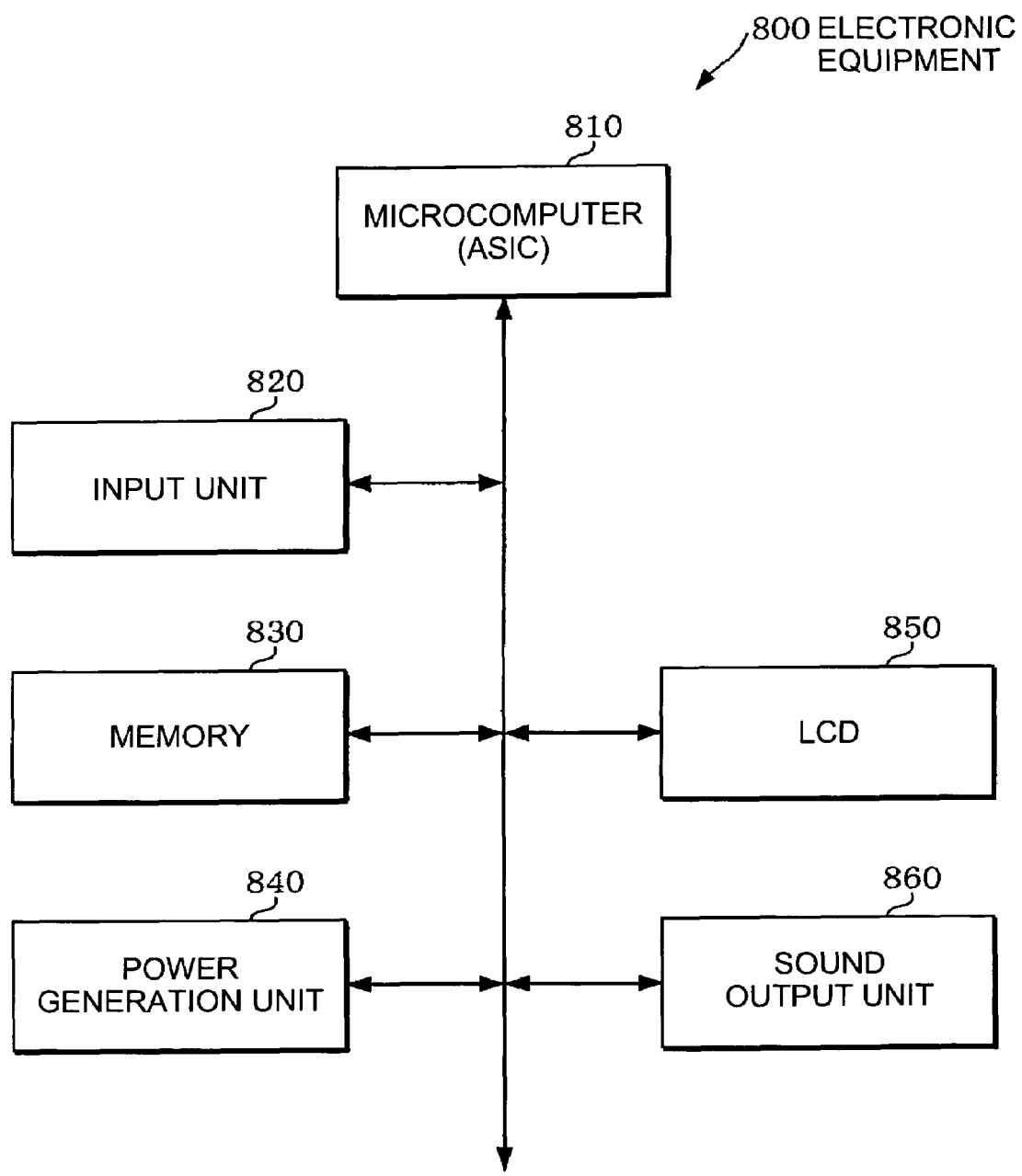
FIG. 6 shows an example of the block diagram of electronic equipment including a microcomputer.

FIG. 6 shows an example of the block diagram of electronic equipment of the present embodiment. Electronic equipment 800 includes a microcomputer (or an application-specific integrated circuit: ASIC) 810, an input unit 820, a memory 830, a power generation unit 840, an LCD 850, and a sound output unit 860.

The input unit 820 is the unit for inputting various data. The microcomputer 810 performs various processes based on the data that is input by the input unit 820. The memory 830 functions as a work area for the microcomputer 810 and other units. The power generation unit 840 is the unit for generating electric power used in the electronic equipment 800. The LCD 850 is the unit for outputting various images (such as characters, icons, and graphics) displayed by the electronic equipment. The sound output unit 860 is the unit for outputting various sounds (such as a voice and game music) and its function can be realized by hardware such as a speaker.

Figure 7A:
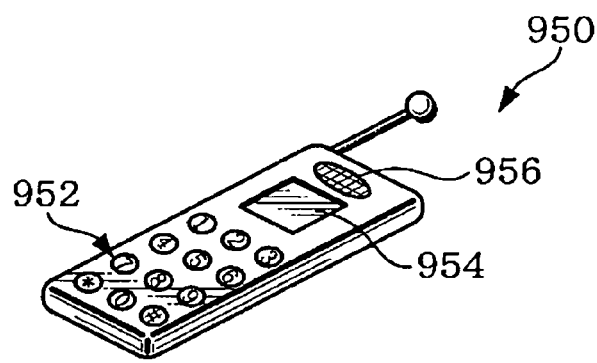
FIGS. 7A, 7B, and 7C are examples of the outline views of various electronic equipment.

FIG. 7A shows an example of the outline view of one of electronic equipment, a cellular phone 950. The cellular phone 950 has dial buttons 952 that function as the input unit, an LCD 954 that displays telephone numbers, names, and icons, and a speaker 956 that functions as the sound output unit to output sounds.

Figure 7B:
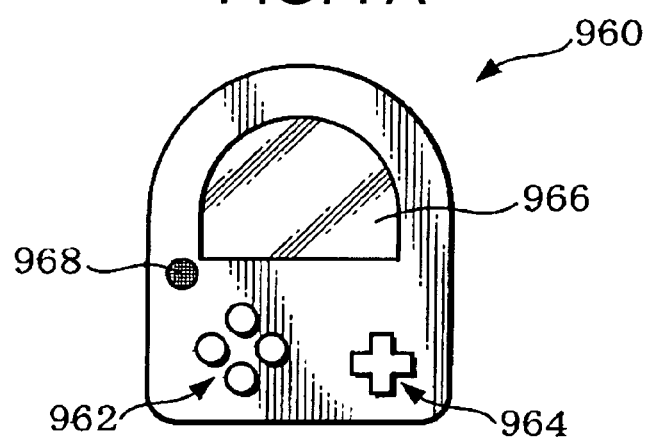

FIG. 7B shows an example of the outline view of one of electronic equipment, a portable type game device 960. The portable type game device 960 has manual operation buttons 962 that function as the input unit, a cross-shape key 964, an LCD 966 that displays game images, and a speaker 968 that functions as the sound output unit to output the game sound.

Figure 7C:
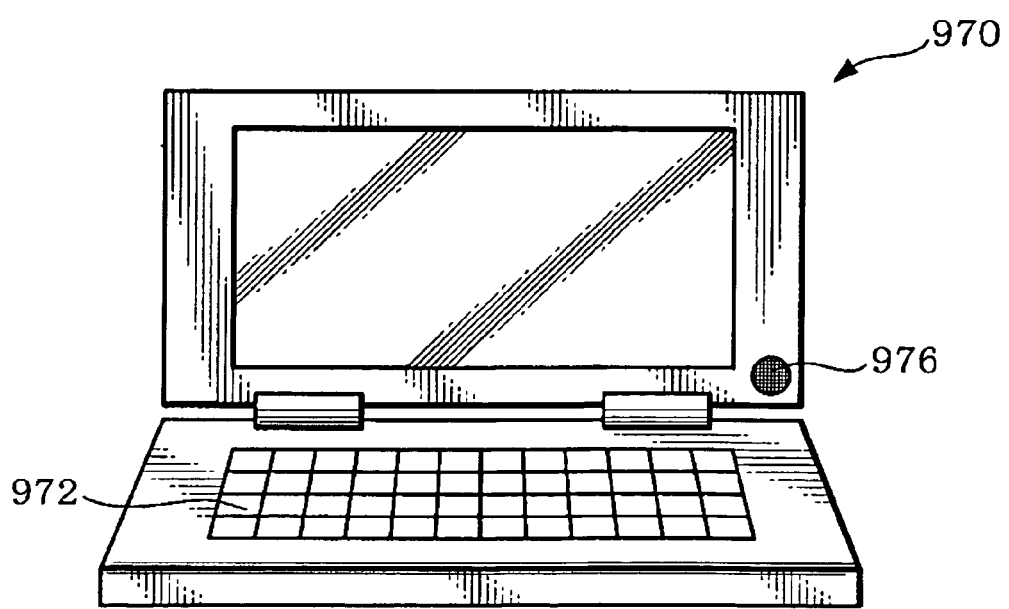

FIG. 7C shows an example of the outline view of one of electronic equipment, a personal computer 970. The personal computer 970 has a keyboard 972, an LCD 974 that displays characters, numerals, graphics, and other items, and a sound output unit 976.

By integrating the microcomputer of the present embodiment into the electronic equipment in FIGS. 7A to 7C, high performance electronic equipment can be provided at low cost.

As electronic equipment that can use the present embodiment, various electronic equipment that uses LCDs such as a personal digital assistance, a pager, an electronic desk calculator, a device with a touch panel, a projector, a word processor, a view finder type or monitor direct view type video tape recorder, and a car navigation device can be considered other than those shown in FIGS. 7A to 7C.

The present invention is not restricted to the present embodiment, and various modifications can be made within the scope of the invention.

Although the present embodiment has been described using the example that the second bus comprises the SDA signals and AREL signals, the invention is not restricted to the example. For example, an address signal line and a data signal line may be separately provided.

Although the present embodiment has been described using the example of obtaining the relative address from the difference between the previous access address and the current access address, the invention is not restricted to the example. For example, the relative address may be obtained in accordance with another rule that the relative address is obtained based on a predetermined base address.

What is claimed:

1. A semiconductor device, comprising:
    a bus master comprising a bus control circuit that receives an access address from a given module through a first bus and requests access based on the received access address to a semiconductor storage medium through a second bus; and
    a bus slave comprising a memory controller that controls access to the semiconductor storage medium based on an access request received through the second bus;
    wherein:
    the bus control circuit of the bus master comprises a first relative address control circuit that performs a process for requesting the access using a relative address to the semiconductor storage medium through the second bus, the process including generation of the relative address corresponding to an absolute address received through the first bus and generation of an identification signal indicating the relative address, the relative address being generated based on a difference between an absolute address corresponding to a previously accessed address and an absolute address of the received access address; and
    the memory controller of the bus slave comprises a second relative address control circuit that decides whether the received access address is a relative address or not and, if the received access address is a relative address, calculates an absolute address based on the relative address and the absolute address corresponding to the previously accessed address.

2. The semiconductor device according to claim 1, wherein an address bus of the second bus is a serial bus.

3. The semiconductor device according to claim 1, wherein data read or written through a data bus of the second bus is transferred based on a previous access data or a relative value from specified value data.

4. A microcomputer, comprising the semiconductor device according to claim 1.

5. Electronic equipment, comprising:
    the microcomputer according to claim 4;
    receiving input information; and
    outputting a result processed by the microcomputer based on the input information.

6. A semiconductor device, comprising a bus master comprising a bus control circuit that receives an access address from a given module through a first bus and requests access based on the received access address to a semiconductor storage medium through a second bus; wherein:

the bus control circuit comprises a first relative address control circuit that performs a process for requesting the access using a relative address to the semiconductor storage medium through the second bus, the process including generation of the relative address corresponding to an absolute address received through the first bus and generation of an identification signal indicating the relative address, the relative address being generated based on a difference between an absolute address corresponding to a previously accessed address and the absolute address received through the first bus.

7. A semiconductor device, comprising a bus slave comprising a memory controller that controls access to a semiconductor storage medium based on an access request received through a bus; wherein:

the memory controller comprises a relative address control circuit that decides whether a received access address is a relative address or not and, if the received access address is a relative address, calculates an absolute address based on the relative address and an absolute address corresponding to a previously accessed address.

* * * * *